United States Patent Office 3,810,963
Patented May 14, 1974

3,810,963
METHOD OF PREPARING A SYNTACTIC
CARBON FOAM
Samuel T. Benton, Knoxville, and Charles R. Schmitt, Oak Ridge, Tenn., assignors to the United States of America as represented by the United States Atomic Energy Commission
No Drawing. Filed Oct. 29, 1971, Ser. No. 194,057
Int. Cl. B44d 5/12; C01b 31/02
U.S. Cl. 264—29                                1 Claim

ABSTRACT OF THE DISCLOSURE

Syntactic carbon foam comprising hollow carbon microspheres in a carbon matrix is prepared by employing the steps of mixing hollow phenolic resin microspheres with a carbonizable resin binder, compacting the mixture, curing the binder while maintaining the mixture under a load corresponding to a pressure greater than ambient pressure, and then heating the mixture to convert the mixture of spheres and binder to carbon.

---

The present invention relates to syntactic carbon foam which possesses a substantially greater compressive strength than previously known syntactic carbon foams at comparable densities, and more particularly to the method of making the improved syntactic carbon foam. This invention was made in the course of, or under, a contract with the U.S. Atomic Energy Commission.

Carbon foams exhibit desirable thermal insulating characteristics, high strength-to-weight ratios, and are particularly useful at relatively high temperatures, particularly in nonoxidizing atmospheres. Of the various types of carbon foams available syntactic carbon foam is especially suitable for some applications where relatively high compressive strengths at low densities are desired. Syntactic carbon foam is formed of hollow carbon spheres or spheroids bound together in a carbon matrix which is provided by a carbonized resin binder.

The hollow microspheres, i.e., spheres in the micron size range, employed in the syntactic foam may be prepared by employing any suitable known technique. For example, satisfactory hollow microspheres may be produced by mixing a volatile blowing agent with suitable phenolic resin such as phenol-formaldehyde, forming droplets of the mixture, and then heating the droplets to cure the resin and volatilize the blowing agent while the resin is still sufficiently plastic for forming the hollow microspheres. The size and wall thicknesses of the microspheres are primarily controlled by the size of the droplets, viscosity of the resin, and the type of blowing agent. Normally, commercially available microspheres in a size range of about 5 to 300 microns have been satisfactory for use in the preparation of syntactic foam but microspheres of other sizes may be readily employed in the method of the present invention. Also, the resin microspheres may be mixed with the resin binder and then converted to carbon along with the resin or, if desired, the resin microspheres may be carbonized prior to forming the mixture with the resin binder.

While syntactic carbon foam as previously prepared provided satisfactory compressive strengths at relatively low densities it was found that the foam had attendant shortcomings which prevented its preparation with even higher compressive strengths at the same densities. These shortcomings included an inadequate bond between the microspheres and the carbon matrix and the presence of cracks in the matrix.

Accordingly, it is a primary objective or aim of the present invention to obviate or substantially minimize the above and other shortcomings by providing an improved method for preparing syntactic carbon foam. This method of preparing syntactic carbon foam comprises the steps of mixing hollow spheres of a carbonizable resin with a polymerizable organic binder, molding the mixture, heating the molded mixture to cure the binder, heating the mixture to carbonize the resin and binder, and subjecting the mixture during at least one of the steps of molding and curing to a load corresponding to a pressure greater than atmospheric pressure. The syntactic carbon foam prepared by practicing the present invention possesses a compressive strength significantly greater than heretofore available at comparable densities as will appear evident upon viewing the description below.

Other and further objects of the invention will be obvious upon an understanding of the illustrative method about to be described, or will be indicated in the appended claims, and various advantages not referred to herein will occur to one skilled in the art upon employment of the invention in practice. While the description below is directed to the use of microspheres prepared from phenolic resin it should be clear that such microspheres may be formed of other carbonizable resins such as alkyds, acrylics, indenes, etc., without departing from the spirit and scope of the present invention.

Generally, the method for preparing a cellular carbonaceous structure, i.e., syntactic carbon foam, in accordance with the teachings of the present invention is practiced by admixing hollow spheres of a carbonizable resin with a polymerizable or curable organic resin binder to prepare a mixture wherein the spheres are uniformly dispersed in the binders. The mixture is molded under pressure into a compact configuration; then the resin is cured under a pressure loading to form a self-supporting structure. The structure is then heated to convert the spheres and the binder to carbon.

The quantity of gases evolved from the microsphere walls and the resin binder during the curing and carbonizing cycle is of considerable importance so as to minimize excessive expansion and subsequent cracking of the carbon foam. Further, cross-linking of the resin binder with the resin forming the walls of the microspheres is also an important consideration since such cross-linking has a direct bearing on the compressive strength of the carbon foam. To these ends it has been found that molding and/or curing, preferably both, the microsphere-binder mixture under a pressure loading substantially increases the compressive strength of the syntactic foam by enhancing the crosslinking of the polymer maetrials forming the binder and the walls of the microspheres. Also, the application of the pressure loading during the molding and curing steps substantially enhances the removal of the entrapped gases from the mixture so as to minimize subsequent cracking during the carbonization of the resinous materials. The applied pressures further assist in maintaining a uniform dispersement of the microspheres in the resin binder until the mixture is adequately rigidized by the curing step. The amount of pressure found satisfactory for use during the molding step may be in the range of about 10 to 200 p.s.i. while the pressure applied during the curing step may range from about 1 to 10 p.s.i.

The compressive strength and density of the syntactic foam increases essentially linearly with the application of pressure during the molding step up to about 95 p.s.i. but between 95 and 200 p.s.i. the compressive strength increases about 30 percent with only a 10 percent increase in density. This increase in compressive strength apparently results from more intimate contact of the microspheres which controls the overall strength of the three-dimensional-chain, fence-like structure, the latter being further reinforced by the binder material at the microsphere wall interface.

A satisfactory technique of subjecting the mixture to a load coresponding to the aforementioned pressures may be achieved by confining the mixture in a container and then compacting the mixture with a movable ram. Of course, other conventional compacting techniques, such as, for example, confining the mixture in a resilient container and then deforming the container to compact the mixture, may be satisfactorily employed.

The preferred syntactic carbon foam should contain hollow microspheres of a narrow size range to assure uniform density and greater strength. Satisfactory results have been achieved by using commercially available microspheres in a size range of about 5 to 300 microns with the best results being achieved by using microspheres in a narrow size range wherein the microspheres vary in size from one another by a maximum of about 50 microns. Microspheres of a size larger or smaller than the aforementioned commercially available size may also be used in the syntactic foam with satisfactory results.

The organic resins providing the binder for the microspheres may be in either a liquid or finely divided solid form. The quantity of binder may vary from about 10 to 50 weight percent with the larger percentages providing the higher density product. Satisfactory results may be achieved by using high carbon-yielding resins such as epoxies; aldehydes, e.g., furfurylaldehyde and phenolformaldehyde; alcohols, e.g., partially polymerized furfuryl alcohol and tetrahydrofurfuryl alcohol; pitches of coal tar, vegetable and petroleum origin; pyrrolidones; polyphenylenes; polyacrylonitrile, and copolymers of vinylidene chloride-acrylonitrile; isotruxene, and decacyclene. When using the binders in liquid form a suitable evaporative solvent such as acetone or xylene may be employed to provide the right viscosity for the mixture. Also, a catalyst for promoting polymerization of the binder is preferably employed. Catalysts suitable for use with resins of the type disclosed herein are well known in the art. For example, acidic catalysts such as maleic anhydride, oxalic acid, citric acid, p-toluene sulfonic acid, and petroleum based sulfonic acids would be suitable for use with partially polymerized furfuryl alcohol and furfuryl alcohol derivatives, amines with epoxy resins, etc. With the binder in solid form a wetting agent such as acetone or furfuryl alcohol may be added to facilitate pressing the mixture. If desired, syntactic foam may be prepared using only the furfuryl alcohol wetting agent without any of the aforementioned resin binders. However, even in this case the furfuryl alcohol polymerizes and provides a binder for the microspheres.

The curing of the mixture under the influence of a pressure loading in the aforementioned range is preferably achieved at a temperature of about 150° C. rather than the lower temperatures, e.g., about 70–90° C., normally used for curing such resins since this higher curing temperature enhances cross-linking of the polymer materials.

Upon completing the curing of the mixture it is carbonized at a temperature of about 800 to 1100° C. in an inert atmosphere of argon, nitrogen, helium, or the like. Preferably, the carbonizing cycle employs a slow temperature increase, e.g., about 15° C. per hour, and duration of about 3 or more days depending upon the size of the foam casting. The physical properties of the syntactic foam include a thermal conductivity of about 0.02 B.t.u./ft.²-hr./° F. at a density of about 0.14 gm./cc. to about 0.08 B.t.u./ft.²-hr./° F. at a density of about 0.44 gm./cc. The compressive strength of the syntactic foam ranges from about 325 p.s.i. at a density of 0.14 gm./cc. to about 1950 p.s.i. at a density of 0.44 gm./cc.

In order to provide a better understanding of the present invention examples relating to typical preparations of syntactic carbon foam in accordance with the present invention are set forth below.

EXAMPLE I

A syntactic foam disc having a diameter of 4 inches and a thickness of 1.5 inches was prepared from a mixture containing 60 grams of hollow phenolic microspheres having a wall thickness of 3 microns and an average diameter of about 100 microns, 10 grams of coal tar pitch, 1.25 grams of the catalyst maleic anhydride, and 10 grams of furfuryl alcohol which was added as a diluent. The mixture was confined in an aluminum container equipped with a selectively movable ram to apply pressure. A load corresponding to a pressure of 100 p.s.i. was applied to mold and compact the confined mixture. The pressure was then allowed to bleed to atmospheric pressure over a one-half-hour period which provided for the escape of the entrapped gases. The compacted mixture was cured at 150° C. for 18 hours with an applied load corresponding to a pressure of one p.s.i. which eliminated expansion cracking and enhanced cross-linkage of the binder material. After the curing cycle, the disc was removed from the container and carbonized at 900° C. in an argon atmosphere by using a three-day heat cycle having a temperature increase rate of 15° C. per hour. The syntactic foam disc had a density of 0.20 gm./cc. and a compressive strength of 541 p.s.i.

EXAMPLE II

A syntactic foam disc having a diameter of 4 inches and a thickness of 1.5 inches was prepared from phenolic microspheres having an average wall thickness of 1.0 micron in the manner described in the first example. The disc had a density of 0.17 gm./cc. and a compressive strength of 452 p.s.i.

The table below further illustrates the properties and characteristics of syntactic carbon foam provided by the method of the present invention.

TABLE.—SYNTACTIC CARBON FOAM MADE BY PRESSURE MOLDING HOLLOW PHENOLIC MICROSPHERES WITH BINDER MATERIAL

[Molding pressure, 1,200 lbs.; temperature curing, 150° C.; carbonizing temperature, 900° C.]

| Binder type [1] | Wt. percent | Furfuryl alcohol (gm.) | Solvent, type/ml. | Density (gm./ml.) | Compressive strength (p.s.i.) [3] | [4] |
|---|---|---|---|---|---|---|
| Pitch | 14 |  | Acetone-50 | 0.25 | 504 | 223 |
| Do | 29 |  | do-50 | 0.28 | 849 | 563 |
| Do | 29 | 10 | do-50 | 0.30 | 1,021 | 380 |
| Decacyclene | 14 | 10 | do-50 | 0.28 | 752 | 356 |
| Pitch | 12.5 } | 10 | do-50 | 0.29 | 944 | 505 |
| Isotruxene | 12.5 } |  |  |  |  |  |
|  |  | 30 | do-50 | 0.31 | 1,044 | 275 |
| Pitch | 14 | 10 | do-50 | 0.20 | 554 | 196 |
| Pitch (8) [1] | 14 | 10 | do-50 | 0.18 | 398 | 273 |
| Pitch (9) [1] | 14 | 10 | do-50 | 0.22 | 711 | 472 |
| (5) | 14 | 10 | do-50 | 0.20 | 477 | 135 |
| (5) | 50 | 30 |  | 0.44 | 1,942 | 548 |
| (5) | 33 | 30 |  | 0.37 | 1,526 | 415 |

[1] Samples 8 and 9 are pressure molded at 166 and 2,500 lbs., respectively.
[2] Binder ground and dry mixed with microspheres except for samples listed at.[5]
[3] Average of 3 test specimens.
[4] At 25 percent deflection.
[5] Partially polymerized furfuryl alcohol.

It will be seen that the present invention provides a significant improvement in syntactic foam as previously available. For example, the compressive strength of syntactic, the commercially available syntactic carbon foam, was in a range of about 140–280 p.s.i. at a density of about 0.20 gm./cc. whereas the syntactic foam of the present invention provides a compressive strength in the range of about 550 to 650 p.s.i. at a comparable density.

What is claimed is:

1. A method of preparing a syntactic carbon foam comprising the steps of mixing hollow spheres wherein the hollow spheres are in a size range of about 5 to 300 microns, and wherein the hollow spheres selected from said size range vary in size from one another a maximum of about 50 microns, of a carbonizable phenolic resin with a polymerizable organic binder wherein said binder provides about 2 to 50 percent of said weight mixture, and wherein said binder is selected from the group of resins consisting of epoxies, furfurylaldehyde, phenolformaldehyde, partially polymerized furfuryl alcohol, tetrahydrofurfuryl alcohol, pitch, pyrrolidones, polyphenylenes, polyacrylonitrile, copolymers of vinylidene chloride-acrylonitrile, isotruxene, and decacyclene, molding the mixture, heating the molded mixture to cure the binder, heating the mixture to carbonize the resin and binder, and subjecting the mixture during the steps of molding and curing to a load corresponding to a pressure greater than atmospheric pressure for enhancing cross-linking of polymer materials forming the binder and walls of the spheres and for removing entrapped gases from the mixture prior to the carbonizing step, said load during the molding step being in the range of about 10 to 200 p.s.i. and said load during the curing step being in the range of about 1.0 to 10 p.s.i.

References Cited

UNITED STATES PATENTS

| | | | |
|---|---|---|---|
| 3,153,636 | 10/1964 | Shanta et al. | 264—29 |
| 3,175,918 | 3/1965 | McGahan et al. | 264—29 |
| 3,567,807 | 3/1971 | Shannon | 264—29 |
| 2,806,509 | 9/1957 | Bozzacco et al. | 161—Dig. 5 |
| 3,632,703 | 1/1972 | Sullivan et al. | 264—41 UX |

DONALD J. ARNOLD, Primary Examiner

U.S. Cl. X.R.

264—41